(12) United States Patent
Jerwick

(10) Patent No.: US 8,337,357 B2
(45) Date of Patent: Dec. 25, 2012

(54) HYBRID VEHICLE AUXILIARY EQUIPMENT ENERGY MANAGEMENT

(75) Inventor: John Jerwick, Hagerstown, PA (US)

(73) Assignee: Mack Trucks, Inc., Greensboro, NC (US)

( * ) Notice: Subject to any disclaimer, the term of this patent is extended or adjusted under 35 U.S.C. 154(b) by 589 days.

(21) Appl. No.: 12/527,775

(22) PCT Filed: Feb. 22, 2007

(86) PCT No.: PCT/US2007/062579
§ 371 (c)(1),
(2), (4) Date: Aug. 19, 2009

(87) PCT Pub. No.: WO2008/103174
PCT Pub. Date: Aug. 28, 2008

(65) Prior Publication Data
US 2010/0093487 A1    Apr. 15, 2010

(51) Int. Cl.
*B60K 1/02*    (2006.01)
(52) U.S. Cl. .......................................................... 477/3
(58) Field of Classification Search .................. 477/3
See application file for complete search history.

(56) References Cited

U.S. PATENT DOCUMENTS

| 5,669,842 A | 9/1997 | Schmidt |
| 7,689,330 B2 * | 3/2010 | Moran ............................. 701/22 |
| 8,062,169 B2 * | 11/2011 | Marr et al. ......................... 477/3 |
| 2006/0030450 A1 * | 2/2006 | Kyle ................................. 477/3 |
| 2006/0116797 A1 | 6/2006 | Moran |
| 2010/0292047 A1 * | 11/2010 | Saito ................................ 477/5 |

FOREIGN PATENT DOCUMENTS

| JP | 2004176624 A | 6/2006 |
| JP | 2006152866 A | 6/2006 |
| WO | 2006134475 A2 | 12/2006 |

OTHER PUBLICATIONS

Supplementary European Search Report dated Jun. 23, 2010 for corresponding application No. EP 07757331.
Cited in action by Japan Patent Office in corresponding JP application No. 2009-550859.

* cited by examiner

*Primary Examiner* — David D Le
*Assistant Examiner* — David J Hlavka
(74) *Attorney, Agent, or Firm* — Martin Farrell; Michael Pruden

(57) ABSTRACT

A parallel hybrid vehicle launches from rest or near rest with its internal combustion engine and with its electric motor/generator in generator mode, accelerates to a maximum speed, and decelerates to rest with its internal combustion engine disengaged and its motor/generator in generator mode. Electrical energy generated is stored in an energy storage device and is only as much energy as needed for operation of the vehicle's electrically powered auxiliary equipment while the vehicle is at rest.

9 Claims, 2 Drawing Sheets

HYBRID VEHICLE AUXILIARY EQUIPMENT ENERGY MANAGEMENT

BACKGROUND

This invention relates to a vehicle, such as a refuse truck, having an internal combustion engine and an electric motor in parallel, meaning that either or both of the engine and motor can drive the vehicle's transmission.

Hybrid vehicles typically use two types of stored energy: chemical and electrical. An internal combustion engine (ICE) in a hybrid vehicle converts chemical energy into mechanical energy in the combustion chambers. An electric motor in the hybrid vehicle converts stored electrical energy into mechanical energy.

In some hybrid vehicles, the electric motors supplement the ICEs, which is to say that the electric motors supply driving torque to assist the ICEs. Such hybrid vehicles are sometimes called "parallel hybrids". Other hybrid vehicles are driven by the electric motors, with the ICEs driving generators that charge batteries or other electric energy storage devices. Such hybrid vehicles are sometimes called "series hybrids".

A parallel hybrid vehicle thus usually includes an ICE, an electric motor, and a transmission, drive shaft, axle carrier, axle, and wheels, all of which are arranged in series to transmit torque from the ICE and motor to the wheels. Such a hybrid vehicle can be operated by either the engine only, or the motor only, or the engine and motor together. The electric motor may be operated as an electric generator during deceleration of such a vehicle to recover some of the vehicle's kinetic energy.

Typical hybrid vehicles, such as that described in U.S. Pat. No. 5,984,033 to Tamagawa et al., size the ICE to meet average power demands and size the electric motor to meet peak power demands. Such typical hybrid vehicles are launched from rest or near-rest by the ICE, and use the electric motor to provide supplementary torque. Depending on the state of charge of the electric energy storage device, the engine can drive the motor as a generator and the motor can act as a regenerator during braking. U.S. Pat. No. 5,942,879 to Ibaraki discloses a hybrid vehicle that uses an electric motor as a generator and vehicle braking device. Recovered energy is managed for controlling a battery's state of charge. During deceleration regeneration, an optimal rotation speed at which the regeneration output of the motor/generator becomes maximal is determined, and the vehicle's transmission gear ratio is controlled such that the rotation speed of the motor/generator is the calculated optimum speed.

U.S. Pat. No. 5,875,864 to Yano et al. discloses calculating an amount of regenerated energy that can be captured during engine deceleration for use in controlling recharge of a battery array. The patent discusses opening an engine intake air valve to reduce engine retarding torque, allowing the motor/generator to capture more energy from slowing the vehicle.

U.S. Pat. No. 6,523,626 to Wakashiro et al. discloses a control device for a hybrid vehicle that monitors the depth of discharge of a storage unit, in particular a capacitor, and recharges the capacitor using regenerative braking or engine output when the depth-of-discharge exceeds a threshold.

U.S. Pat. No. 6,587,649 to Shimasaki et al. discloses a hybrid vehicle that has two batteries, a higher-voltage battery for driving the motor and a lower-voltage battery for driving auxiliary equipment, such as power steering equipment, brakes, etc. The lower-voltage battery is charged by excess voltage produced by the engine's driving a generator, enabling the auxiliary equipment to be run without the engine.

U.S. Pat. No. 6,945,905 to Tamai et al. discloses methods of monitoring the state of charge of a battery in a hybrid vehicle and selecting a gear ratio so that a motor/generator produces a desired level of regenerated braking energy. U.S. Patent Application Publication No. 2004/0204797 by Vickers describes an apparatus for regulating the engine in a hybrid vehicle. A circuit computes a distance from the vehicle to a predetermined destination and senses an amount of energy in an electric storage cell. The circuit regulates the engine as a function of the distance and the amount of energy, giving the vehicle operator the option of arriving with low charge and using an electric outlet for charging, or using engine or braking regeneration on the way for recharging.

Of course, such designs are not optimal for every vehicle application, in particular delivery and pick-up applications that involve frequent starts and stops. In such applications, careful management of the energy expended during acceleration and the energy regenerated during deceleration is necessary for optimal vehicle efficiency. Thus, these and other prior approaches to energy management in hybrid vehicles still suffer from drawbacks in various vehicle applications, such as delivery and pick-up applications.

SUMMARY

This invention provides an energy management strategy for running a hybrid vehicle's auxiliary equipment, such as the air compressor system and steering system, with electric power in a way that eliminates the need to constantly run the internal combustion engine to drive a generator.

In accordance with aspects of this invention, there is provided a method of operating a parallel hybrid vehicle having an electric motor/generator, an internal combustion engine (ICE), an electric energy storage device, and electrically powered auxiliary equipment. The method includes the steps of accelerating the vehicle from rest or near rest with the ICE while having the motor/generator in generator mode; increasing the vehicle's speed to a terminal speed with the ICE; decelerating the vehicle from the terminal speed to rest or near rest with the ICE disengaged and the motor/generator in generator mode; storing electric energy generated by the motor/generator during acceleration and deceleration of the vehicle in the electric energy storage device; and operating the auxiliary equipment with stored electric energy while the vehicle is at rest or near rest. An amount of electric energy stored is substantially the same as an amount of electric energy used to operate the auxiliary equipment while the vehicle is at rest or near rest.

In accordance with further aspects of this invention, there is provided a parallel hybrid vehicle that includes an electric motor/generator; an ICE; an electric energy storage device; electrically powered auxiliary equipment; and at least one controller. The controller is configured to control the ICE, the electric motor/generator, and the energy storage device such that the vehicle accelerates from rest or near rest to a terminal speed with the ICE and with the electric motor/generator in generator mode, decelerates from the terminal speed to rest or near rest with the ICE disengaged and the electric motor/generator in generator mode, and stores electric energy generated by the motor/generator in the electric energy storage device. An amount of electric energy generated by the motor/generator and stored in the electric energy storage device is substantially the same as an amount of energy used by the electrically powered auxiliary equipment while the vehicle is at rest or near rest.

BRIEF DESCRIPTION OF THE DRAWINGS

The objects, features, and advantages of this invention will be understood by reading this description in conjunction with the drawings, in which.

DETAILED DESCRIPTION

Figure 1:
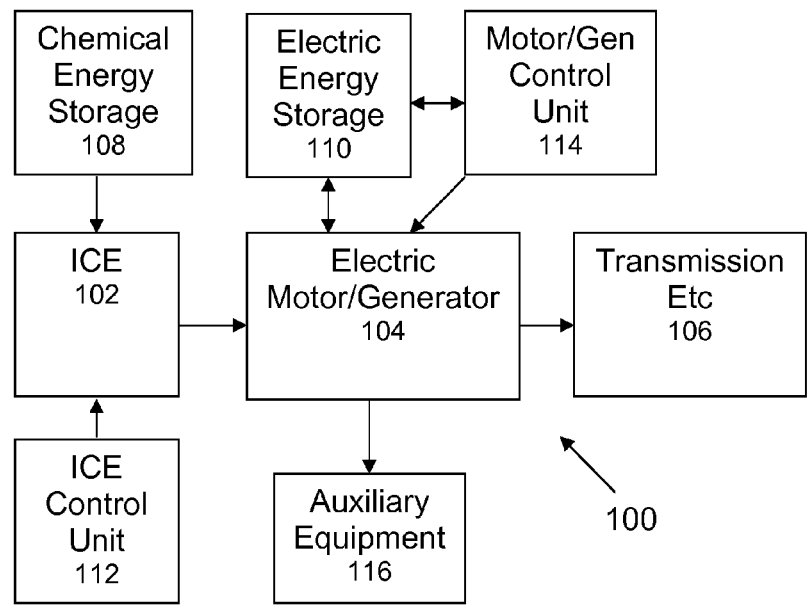
FIG. 1 is a block diagram of a parallel hybrid vehicle.

FIG. 1 is a block diagram of a typical parallel hybrid vehicle 100, which includes an ICE 102, an electric motor/generator 104, and a transmission, drive shaft, axle carrier, axle, and wheels 106. As described above, the components 102, 104, 106 are arranged in series to transmit torque from the ICE and motor to the transmission and wheels. Also shown in FIG. 1 are a chemical energy storage device 108 for the ICE 102, e.g., a fuel tank, and an electric energy storage device 110 for the motor/generator 104, e.g., a rechargeable battery, capacitor, magnetic or inductive media, fuel cell, flywheel, or compressed air or other fluid storage device.

The operations of the ICE 102 and motor/generator 104 are controlled by respective suitable programmable electronic control units 112, 114 that may cooperate with each other in operating the ICE 102 and motor/generator 104. For example, the transmission 106 may be an automated manual transmission, and during shifting of the transmission's gear box, a clutch can disconnect the ICE 102 from the drive train and the electric motor/generator 104 can synchronize the gear shift. An electronic control unit determines the proper motor speed for the corresponding shaft speed in the transmission for the next selected gear such that it is synchronous with the shaft speed for the driving wheels.

The control unit 114 is also shown as controlling the operation of the electric energy storage 110 such that the storage 110 can deliver energy to the motor/generator 104 and receive energy from the motor/generator 104, as appropriate. For reasons that are described in more detail below, the controller 114 measures or receives a measure of the state of charge of the electric energy storage device 110. The energy produced by the motor/generator 104 is derived from the kinetic energy of the transmission etc. 106. The controllers 112, 114 are shown as separate devices but it will be understood that this is done merely for example as many arrangements of the functionality implemented by the controllers are possible.

Also indicated in FIG. 1 is auxiliary vehicle equipment 116, such as an air compressor system, vehicle steering system, etc., that is electrically driven. In accordance with aspects of this invention, there is provided an energy management strategy for running auxiliary equipment 116 in a way that eliminates the need to constantly run the ICE 102 to drive the generator 104.

The arrangement depicted in FIG. 1 can be used for many applications, including delivery/pick-up applications, e.g., mail and package delivery and trash pick-up. For example, a typical trash pick-up truck uses a diesel engine for converting chemical energy into mechanical energy for propulsion. In a conventional trash truck, mechanical energy is dissipated in mechanical friction brakes in the form of heat, but in a hybrid trash truck, the mechanical energy is not completely dissipated but generates, or re-generates, electric energy that is stored.

The duty cycle of a vehicle 100 in a delivery/pick-up application typically comprises launching the vehicle from rest or near rest with the ICE 102 and accelerating to a given terminal speed, e.g., 12 miles per hour (mph) with the motor/generator 104 in generator mode. When the vehicle 100 reaches terminal speed, the ICE 102 is turned off based on brake pedal application, and the motor/generator 104 remains in generator mode until the vehicle 100 comes to rest or near rest. While the vehicle 100 is at rest, the vehicle's operators typically add to the vehicle's load for a period of time. During this vehicle rest period, the vehicle's auxiliary equipment 116 is driven electrically, and the state of charge of the energy storage system 110 is drawn down. Then the vehicle 100 is launched from rest with the ICE 102, and the cycle repeats as needed. This may be called a first operating mode of the vehicle 100.

If the vehicle is not in this first operating mode, the vehicle reverts to a second operating mode with an automated manual transmission. This second operating mode may be used for vehicle operation from pick-up of the final load to transfer of the vehicle load at a transfer station or disposal site. In the second operating mode, the motor/generator 104 is operated in generator mode from time to time as necessary while driving to maintain the state of charge of the energy storage system 110.

In either the first or second operating mode, the state of charge of the electric energy storage system 110 may be adjusted by running the motor/generator 104 as a motor during vehicle launch or starting the ICE 102 and running the motor/generator 104 as a generator while at vehicle rest.

The use of energy in the hybrid vehicle's electrical system can be conveniently measured by monitoring the SOC of the energy storage 110. Recovery of energy used by the motor 104 and ICE 102 in propulsion can be accomplished by changing the electrical mode of the motor/generator 104 from a motor to a generator rather than dissipating the energy in the vehicle's brakes. Mechanical energy is converted to electrical energy during the vehicle retarding process by the generator 104, and the generated electrical energy is added to the energy storage unit 110 until its state of charge is determined to be back to a nominal value. The electrical energy generation provides a retarding torque to the wheels that slows the vehicle, and thereby reduces the amount of energy dissipated by the vehicle's service brakes, which in turn reduces the service interval of the wear component of the braking system. The energy captured by the motor/generator 104 and stored in the energy storage unit 110 can be used by the motor/generator to propel the vehicle.

The inventor has recognized that careful energy management can enable the vehicle 100 to operate in the first operating mode and the auxiliary equipment 116 to run without requiring the ICE 102 constantly to drive the motor/generator 104 when the electric energy requirement of the auxiliary equipment 116 is greater than the electric energy that can be recovered during deceleration of the vehicle in the first operating mode.

The presence of electrified auxiliary equipment 116 eliminates the need to operate the engine 102 in order to operate such equipment. Improved energy utilization and efficiencies can be realized with the capability of turning the internal combustion engine off during the vehicle duty cycle. Unlike a typical hybrid vehicle, a vehicle in accordance with this invention does not provide supplemental torque from the motor/generator 104 to the wheels but reduces torque to the wheels, diverting energy from the ICE 102 that is in excess of vehicle needs to the generator 104 for storage in the energy storage system 110. By doing this, engine on-time can be reduced for the first operating mode by as much as about 75%.

Figure 2:
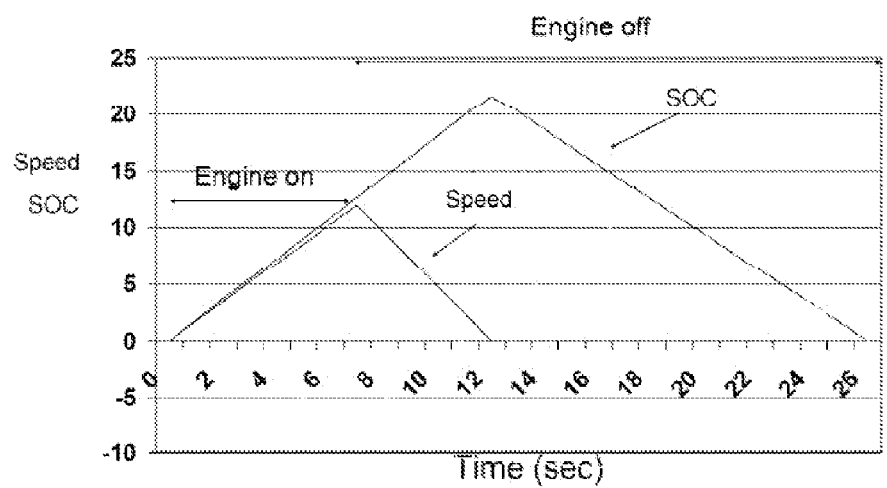
FIG. 2 depicts the speed and state of charge of a vehicle in a first operating mode.

The first operating mode with energy management is depicted in FIG. 2, which shows the state of charge (SOC) of the energy storage system 110 and the vehicle's speed as functions of time. Speed in mph and SOC in an arbitrary scale are shown on the vertical axis, and time in seconds is shown on the horizontal scale. As shown, the vehicle starts with its ICE 102 on, and its speed increases to about 12 mph after about 7 seconds, at which point the ICE 102 is turned off (and remains off for the remainder of the times depicted in FIG. 2) and the vehicle's speed decreases to about zero at between 12 and 13 seconds. The SOC starts increasing from a nominal level as the vehicle speed increases, and the SOC continues increasing as the vehicle decelerates due to operation of the motor/generator 104 as a generator, until the vehicle's speed drops to about zero. The SOC then decreases back to the nominal level at about 26 seconds while the auxiliary equipment 116 is operated with the ICE 102 off. This behavior repeats in the first operating mode as described above.

Figure 3:
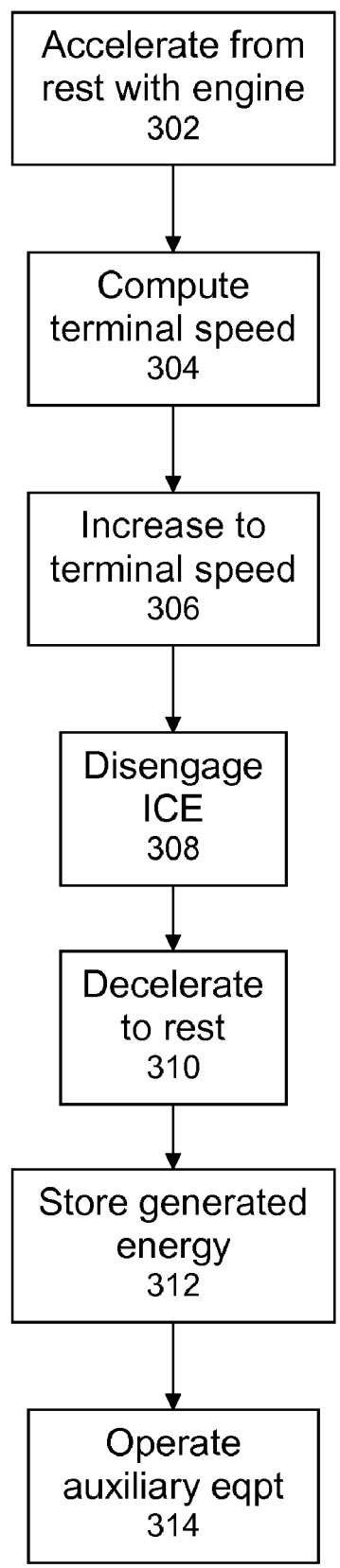
FIG. 3 is a flow chart of a method of energy management.

Energy management as depicted in FIG. 2 is readily implemented by suitable programming in one or more of the controllers 112, 114. In response to the programming, the controller(s) carry out the steps of a method such as that depicted by the flow chart in FIG. 3, in which the vehicle 100 is launched with the ICE 102 and is propelled without assistance from its motor/generator 104 to a speed that is determined as just about high enough such that electrical energy generated during deceleration can be sufficient to power the vehicle's auxiliary equipment 116.

Accordingly, the method begins by accelerating the vehicle from rest or near rest with its engine 102 (step 302). A terminal speed may be computed by a controller based on the state of charge of the storage system and the energy requirements of the auxiliary equipment (step 304), and the vehicle's speed is increased to the terminal speed by operation of the ICE 102 (step 306). The engine 102 is then disengaged (e.g., shut off) (step 308) and the vehicle's speed decreases to rest or near rest (step 310). During deceleration, some of the kinetic energy of the vehicle is recovered by continuing to operate the electric motor as a generator and stored in the vehicle's energy storage device (step 312). The vehicle's auxiliary equipment 116 is then operated with the stored energy (step 314). This method can be repeated in each start/stop cycle of the vehicle.

Energy used by the motor and ICE in propulsion can be regenerated in a conventional way by changing the state of the motor/generator from a motor state to a generator state. Such a state change is readily accomplished in a known way by operations of the controller 114. As described above, the motor/generator's generating electrical energy provides a retarding torque to the wheels that slows the vehicle, and any additional retarding torque needed by the driver to slow the vehicle is furnished by the vehicle's service brakes. One of the advantages of a hybrid vehicle is that the regenerating process reduces the amount of energy dissipated by the service brakes, which in turn reduces their maintenance interval.

If the energy required by the auxiliary equipment 116 is less than the energy that can be recovered during vehicle deceleration in the first operating mode, the vehicle can be launched electrically with the motor/generator in motor mode and the engine can be blended in at an estimated vehicle speed, providing to the motor from the energy storage system only the electrical energy that can be recovered in deceleration of the vehicle. When the vehicle reaches terminal speed, the engine can be turned off based on brake pedal application, and the motor/generator can be in generator mode until the vehicle comes to rest.

This is described in co-pending International Patent Application No. PCT/US2007/62575 by Jerwick filed on the same date as this application for "Hybrid Vehicle Energy Management Methods and Apparatus", which is incorporated here by reference.

It is expected that this invention can be implemented in a wide variety of environments, including for example trash pick-up trucks. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many vehicles can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of operating a parallel hybrid vehicle having an electric motor/generator, an internal combustion engine (ICE), an electric energy storage device, and electrically powered auxiliary equipment, comprising the steps of:

accelerating the vehicle from rest or near rest to a terminal speed with the ICE while operating the motor/generator in generator mode;

decelerating the vehicle from the terminal speed to rest or near rest with the ICE disengaged and operating the motor/generator in generator mode;

storing electric energy generated by the motor/generator during acceleration and deceleration of the vehicle in the electric energy storage device; and operating the auxiliary equipment with stored electric energy while the vehicle is at rest or near rest.

2. The method of claim 1, wherein the terminal speed is calculated based on an amount of electrical energy required to restore a state of charge of the electric energy storage device to a state of charge before operating the auxiliary equipment with stored electric energy.

3. The method of claim 1, wherein the amount of electric energy stored in the step of storing electric energy is determined from a difference between a nominal state of charge of the electrical storage device and a measured state of charge of the electric energy storage device as acceleration of the vehicle begins.

4. A parallel hybrid vehicle, comprising:
an electric motor/generator;
an internal combustion engine (ICE);
an electric energy storage device;
electrically powered auxiliary equipment; and
at least one controller that is configured to control the ICE, the electric motor/generator, and the energy storage device such that the vehicle accelerates from rest or near rest to a terminal speed powered by the ICE and with the electric motor/generator operating in generator mode, decelerates from the terminal speed to rest or near rest with the ICE disengaged and the electric motor/generator operating in generator mode, and stores electric energy generated by the motor/generator in the electric energy storage device.

5. The vehicle of claim 4, wherein the at least one controller is configured to calculate the terminal speed based on an amount of electric energy withdrawn from the energy storage device by operation of the electrically powered auxiliary equipment during a duty cycle of the vehicle.

6. The vehicle of claim 4, wherein the controller is configured to operate the motor/generator in generator mode so that an amount of electric energy stored during acceleration and deceleration of the vehicle is sufficient to restore a state of charge of the electric energy storage device to a nominal state.

7. The method of claim 1, wherein the steps of accelerating the vehicle, decelerating the vehicle, generating electrical energy, storing electrical energy, and operating auxiliary equipment comprise a duty cycle of the vehicle, the method comprising the steps of:

monitoring a decrease in a state of charge of the energy storage device while the auxiliary equipment is operated during a first duty cycle; and, operating the motor/generator in generator mode during a subsequent duty cycle acceleration and deceleration such that the state of charge of the energy storage device is increased by an amount substantially the same as the monitored decrease in the state of charge during the first duty cycle.

8. A method of operating a parallel hybrid vehicle having an electric motor/generator, an internal combustion engine (ICE), an electric energy storage device, and electrically powered auxiliary equipment, comprising the steps of:

during a first duty cycle, accelerating the vehicle from rest or near rest to a terminal speed powered by the ICE and operating the motor/generator in generator mode;

decelerating the vehicle from the terminal speed to rest or near rest with the ICE disengaged and operating the motor/generator in generator mode;

storing electric energy generated by the motor/generator during acceleration and deceleration of the vehicle in the electric energy storage device;

operating the auxiliary equipment with stored electric energy while the vehicle is at rest or near rest;

monitoring an amount of electrical energy drawn from the electrical energy storage device while operating the auxiliary equipment; and, during a second duty cycle, controlling generator mode operation of the motor/generator such that an amount of electrical energy generated during acceleration and deceleration of the vehicle is substantially the same as an amount of electrical energy drawn from the storage device during the first duty cycle.

9. A parallel hybrid vehicle, comprising:
an electric motor/generator;
an internal combustion engine (ICE);
an electric energy storage device;
electrically powered auxiliary equipment; and
at least one controller that is configured to control the ICE, the electric motor/generator, and the energy storage device such that the vehicle accelerates from rest or near rest to a terminal speed powered by the ICE and with the electric motor/generator operating in generator mode, decelerates from the terminal speed to rest or near rest with the ICE disengaged and the electric motor/generator operating in generator mode, and stores electric energy generated by the motor/generator in the electric energy storage device, wherein the at least one controller is configured to calculate the terminal speed based on an amount of electric energy withdrawn from the energy storage device by operation of the electrically powered auxiliary equipment during a duty cycle of the vehicle.

* * * * *